United States Patent
Chakraborty et al.

(10) Patent No.: US 10,360,341 B2
(45) Date of Patent: Jul. 23, 2019

(54) INTEGRATED METAL LAYER AWARE OPTIMIZATION OF INTEGRATED CIRCUIT DESIGNS

(71) Applicant: Synopsys, Inc., Mountain View, CA (US)

(72) Inventors: Abhijeet Chakraborty, Saratoga, CA (US); David John Seibert, Mountain View, CA (US); Pingkan Fok, Mountain View, CA (US); Ramoji Karumuri Rao, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 110 days.

(21) Appl. No.: 15/693,231

(22) Filed: Aug. 31, 2017

(65) Prior Publication Data
US 2019/0065656 A1 Feb. 28, 2019

(51) Int. Cl.
*G06F 17/50* (2006.01)

(52) U.S. Cl.
CPC ...... *G06F 17/5081* (2013.01); *G06F 17/5072* (2013.01); *G06F 17/5077* (2013.01); *G06F 2217/84* (2013.01)

(58) Field of Classification Search
USPC ....... 716/114, 113, 122, 123, 129, 130, 134, 716/133, 135, 136; 703/16
See application file for complete search history.

(56) References Cited

U.S. PATENT DOCUMENTS

| | | | | |
|---|---|---|---|---|
| 5,471,093 A * | 11/1995 | Cheung | ............... | H01L 23/5222 257/752 |
| 5,815,406 A | 9/1998 | Golla et al. | | |
| 6,430,729 B1 * | 8/2002 | Dewey | ............... | G06F 17/5036 716/115 |
| 7,089,143 B2 * | 8/2006 | Foreman | ............ | G01R 31/3016 702/125 |
| 7,137,093 B2 * | 11/2006 | Harn | .................. | G06F 17/5072 716/113 |
| 7,793,247 B1 * | 9/2010 | Duthou | ............... | G06F 17/5068 716/113 |

(Continued)

FOREIGN PATENT DOCUMENTS

JP 2002313919 A * 10/2002

OTHER PUBLICATIONS

Zhuo Li, et al., "Fast Interconnect Synthesis with Layer Assignment", Proceedings of the 2008 International Symposium on Physical Design, pp. 71-77.

(Continued)

*Primary Examiner* — Phallaka Kik
(74) *Attorney, Agent, or Firm* — Park, Vaughan, Fleming & Dowler LLP; Laxman Sahasrabuddhe

(57) ABSTRACT

Systems and techniques are described for optimizing an integrated circuit (IC) design. Before routing is performed on the IC design in an IC design flow, an IC design tool can iteratively perform a set of operations, the set of operations comprising: (1) modifying a net in the IC design to obtain a modified net, (2) determining a metal layer for routing the modified net, (3) computing a resistance value and a capacitance value of the modified net based on the metal layer, and (4) computing a delay value for the modified net based on the resistance value and the capacitance value.

20 Claims, 6 Drawing Sheets

(56) References Cited

U.S. PATENT DOCUMENTS

| | | | |
|---|---|---|---|
| 7,853,915 B2 | 12/2010 | Saxena et al. | |
| 8,875,075 B2 | 10/2014 | Kennedy et al. | |
| 9,773,083 B1* | 9/2017 | Das | G06F 17/5072 |
| 2001/0054920 A1* | 12/2001 | Tsujino | G06F 1/10 |
| | | | 327/141 |
| 2004/0025134 A1* | 2/2004 | Jung | G06F 17/5077 |
| | | | 716/114 |
| 2004/0216069 A1* | 10/2004 | Fujita | G06F 17/505 |
| | | | 716/114 |
| 2005/0091621 A1* | 4/2005 | Goldberg | G06F 17/5031 |
| | | | 716/104 |
| 2007/0050745 A1* | 3/2007 | Dinter | G06F 17/5031 |
| | | | 716/114 |
| 2007/0106968 A1* | 5/2007 | Culp | G06F 17/5068 |
| | | | 716/53 |
| 2007/0266356 A1* | 11/2007 | Chang | G06F 17/5009 |
| | | | 716/52 |
| 2009/0144688 A1* | 6/2009 | Uchino | G06F 17/5077 |
| | | | 716/126 |
| 2011/0124193 A1* | 5/2011 | Cheng | G06F 17/5068 |
| | | | 438/669 |
| 2011/0204470 A1* | 8/2011 | Cheng | G06F 17/5068 |
| | | | 257/499 |
| 2012/0110541 A1* | 5/2012 | Ge | G06F 17/5031 |
| | | | 716/134 |
| 2012/0317523 A1* | 12/2012 | Agarwal | G03F 1/70 |
| | | | 716/52 |
| 2015/0213188 A1* | 7/2015 | Chowdhury | G06F 17/5081 |
| | | | 716/114 |
| 2016/0232276 A1* | 8/2016 | Daellenbach | G06F 17/5072 |
| 2017/0011158 A1* | 1/2017 | Berry | G06F 17/5072 |
| 2017/0323047 A1* | 11/2017 | Hsu | G06F 17/5081 |

OTHER PUBLICATIONS

Shiyan Hu, et al., "A Fully Polynomial-Time Approximation Scheme for Timing-Constrained Minimum Cost Layer Assignment", IEEE Transactions on Circuits and Systems—II: Express Briefs, vol. 56, No. 7, Jul. 2009.

Andrew B. Kahng, et al., "More Practical Bounded-Skew Clock Routing", DAC '97 Proceedings of the 34th annual Design Automation Conference, pp. 594-599.

C. Guardiani, et al., "Modeling the Effect of Wire Resistance in Deep Submicron Coupled Interconnects for Accurate Crosstalk Based Net Sorting", Adanced Research, Central R&D, DAIS, STMicroelectronics, via C.Olivetti, 2, I-20041 Agrate B., (MI), Italy, downloaded from http://xputers.informatik.uni-kl.de/conferences/patmos/patmos98/guardiani.pdf on Sep. 1, 2017.

* cited by examiner $$u_i = utilization\ per\ layer$$
$$u_{ti} = utilization\ target\ per\ layer$$
$$p_i = cost\ penalty\ per\ layer$$
$$c_{ni} = cost\ per\ net\ per\ layer$$
$$C1_i = \sum_n c_{ni}\ \text{if min}(c_n)$$
$$C2_i = \sum_n c_{ni}\ \text{if min2nd}(c_n)$$
$while\ \exists_i: u_i > u_{ti}:$
    $for\ i:$
        $if\ u_i > u_{ti}:$
$$p_i = p_i + k * p_i * \left(\frac{C2_i}{C1_i} - 1\right) * (u_i - u_{ti})$$
FIG. 4
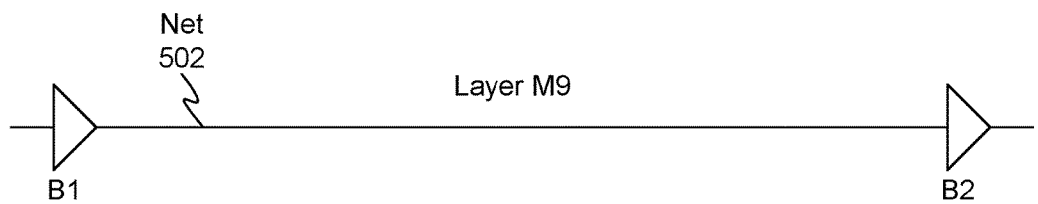
FIG. 5A
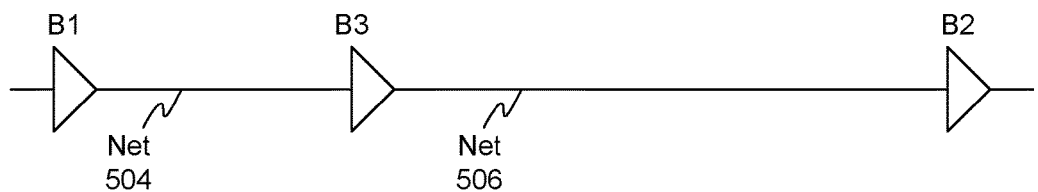
FIG. 5B

US 10,360,341 B2

INTEGRATED METAL LAYER AWARE OPTIMIZATION OF INTEGRATED CIRCUIT DESIGNS

TECHNICAL FIELD

This disclosure relates to integrated circuits (ICs). More specifically, this disclosure relates to techniques and systems for integrated metal layer aware optimization of integrated circuit designs.

BACKGROUND

Related Art

Advances in process technology and an almost unlimited appetite for consumer electronics have fueled a rapid increase in the size and complexity of IC designs. Existing IC design tools and IC design flows can have long runtimes and/or poor quality of results (QoR).

SUMMARY

Some embodiments described herein provide techniques and systems for optimizing an IC design before routing is performed on the IC design in an IC design flow. During synthesis or pre-route optimization (these steps are performed before routing), an IC design tool can iteratively perform a set of optimization operations to minimize (1) a delay objective function for the IC design, (2) an area objective function for the IC design, and/or (3) a leakage power objective function for the IC design. The set of optimization operations can comprise: (1) modifying a net in the IC design to obtain a modified net, (2) determining a metal layer for routing the modified net, (3) computing a resistance value and a capacitance value of the modified net based on the metal layer, and (4) computing a delay value for the modified net based on the resistance value and the capacitance value.

Computing the resistance value and the capacitance value of the modified net can comprise computing a unit resistance value and a unit capacitance value for the metal layer based on technology data that specifies physical and electrical characteristics of a set of metal layers that are created when an IC is manufactured based on the IC design. Computing the resistance value of the modified net can also comprise computing a via resistance value for the modified net based on the metal layer.

The delay value of the modified net can be used to calculate the value of a timing metric (e.g., the total negative slack, the worst negative slack, etc.), and the timing metric can be used to decide whether or not to accept the optimization-related modification that was performed on the net. For example, if the modification worsened a timing metric without improving another performance metric, then the IC design tool may decide to undo (or not accept) the modification and try a different modification. Optimization-related modifications can comprise (1) inserting or deleting a buffer in the net, (2) inserting or deleting an inverter in the net, (3) moving one or more gates to a new location in the net, (4) resizing one or more gates in the net, and/or (5) replacing the net with another net that performs an equivalent logical function.

Determining the metal layer to route the modified net can comprise, for each metal layer in a set of metal layers, (1) computing a routing cost for the modified net, and (2) selecting a metal layer having a lowest routing cost in the set of metal layers. The routing cost can be computed based on a set of parameters comprising (1) a horizontal length of the modified net, (2) a vertical length of the modified net, (3) metal layers associated with pins of the modified net, (4) a timing slack of the modified net, and (5) a metal layer utilization value associated with the metal layer. After determining the metal layer, the metal layer utilization value associated with the metal layer can be updated so that future iterations of the set of optimization operations can use the updated metal layer utilization value.

BRIEF DESCRIPTION OF THE FIGURES

FIG. 4 illustrates a penalty cost computation in accordance with some embodiments described herein.

FIGS. 5A-5C illustrate an advantage of integrated metal layer aware IC design optimization in accordance with some embodiments described herein.

DETAILED DESCRIPTION

Figure 1A:
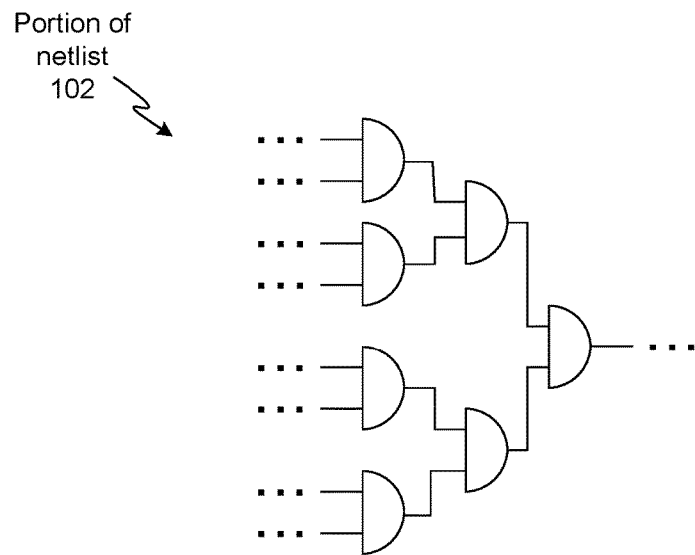
FIG. 1A illustrates an IC design after synthesis in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of IC Design and Manufacturing

IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher QoR.

IC design software tools enable IC designers to describe the functionality that the IC designers want to implement. These tools also enable IC designers to perform what-if planning to refine functionality, check costs, etc. An IC design can be specified using different representations as the IC design progresses through an IC design flow, wherein the different representations represent the IC design at different levels of abstraction. In general, higher levels of abstraction contain fewer details and rougher approximations of the IC design when compared with lower levels of abstraction. The IC design is described at a high level of abstraction in the early stages of the IC design flow, and the level of abstraction becomes progressively lower as the IC design moves through the IC design flow. For example, toward the beginning of the IC design flow, an IC design can be described at a high level of abstraction by using a hardware description language (HDL) which describes the functionality of the IC design but does not provide any information about the actual geometric shapes that will be printed on the wafer. Toward the end of the IC design flow, the same IC design can be represented in a low level of abstraction, e.g., in GDSII or OASIS, which provides detailed information of the actual geometric shapes that are to be printed on the wafer. In between these two ends of the IC design flow, the IC design may be represented using different formats or data-description-languages that describe the same IC design at different levels of abstraction.

Some examples of the steps in an IC design flow are now described. These examples are for illustrative purposes only and are not intended to limit the embodiments to the forms disclosed. During logic design and functional verification, the HDL code (e.g., SystemVerilog) can be written and the design can be checked for functional accuracy, e.g., the design can be checked to ensure that it produces the correct outputs. During synthesis, the HDL code can be translated to a netlist. During design planning, an overall floorplan for the chip can be constructed and analyzed for timing and top-level routing. During physical implementation, circuit elements can be positioned (placement) in the layout and can be electrically connected (routing). During analysis and extraction, the IC design's functionality can be verified at a transistor level and parasitics can be extracted. During physical verification, the design can be checked to ensure correctness for manufacturing, electrical issues, lithographic issues, and circuitry. During resolution enhancement, geometric manipulations can be performed on the layout to improve manufacturability of the design. During mask data preparation, the design can be "taped-out" to produce masks which are used during fabrication.

IC Design Optimization

As mentioned above, the HDL code can be translated to a netlist during synthesis. A netlist describes a network of logical building blocks (e.g., AND gates, OR gates, MUXs, etc.) that implement the desired functionality of the IC design. After the synthesis stage, the IC design flow can perform placement, during which the network of logical building blocks is implemented by using a network of cells. A cell represents an actual portion of the physical IC chip that will be created when the IC design is manufactured. Placement involves assigning a physical location to each cell in the IC design. After placement, the IC design flow can perform routing, which involves determining routes for metal wires to electrically connect the placed cells.

A netlist is a list (or collection) of "nets." Each "net" refers to a set of gates (or cells) whose inputs/outputs are electrically connected. For example, suppose a driver cell drives the inputs of a set of driven cells. In this example, the term "net" can refer to the portion of the netlist that includes the driver cell, the set of driven cells, and the electrical connections (e.g., the network of metal wires) that connect the output of the driver cell and the inputs of the set of driven cells. Each of these steps—synthesis, placement, and routing—is complex and includes multiple sub-steps. During an actual IC design flow, multiple iterations may be required before the IC design converges and meets the desired performance and yield targets.

Figure 1B:
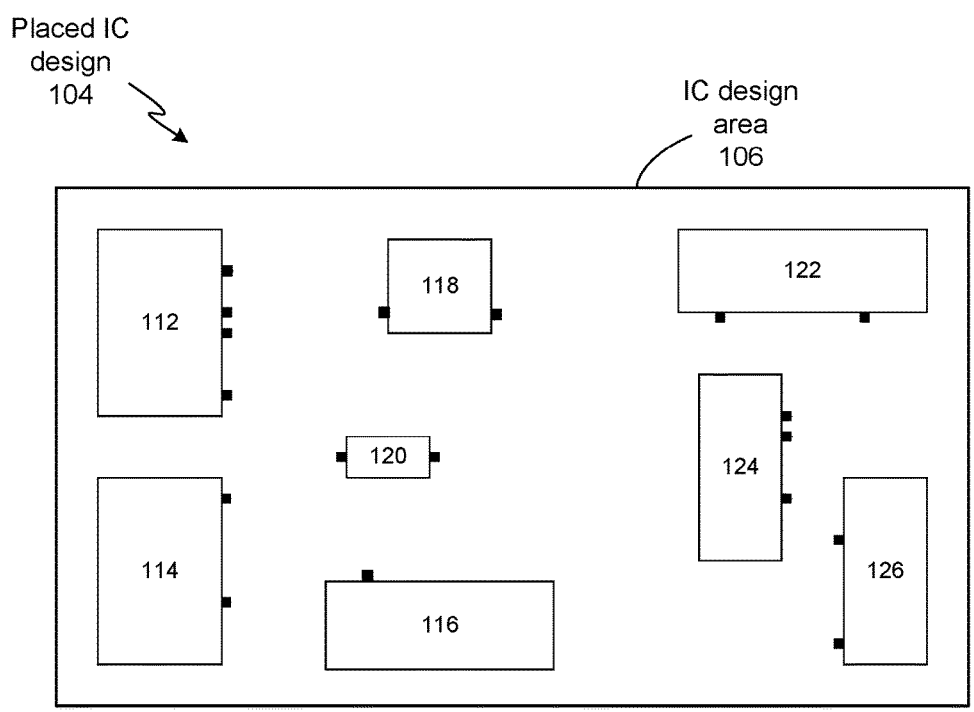
FIG. 1B illustrates an IC design after placement in accordance with some embodiments described herein.
Figure 1C:
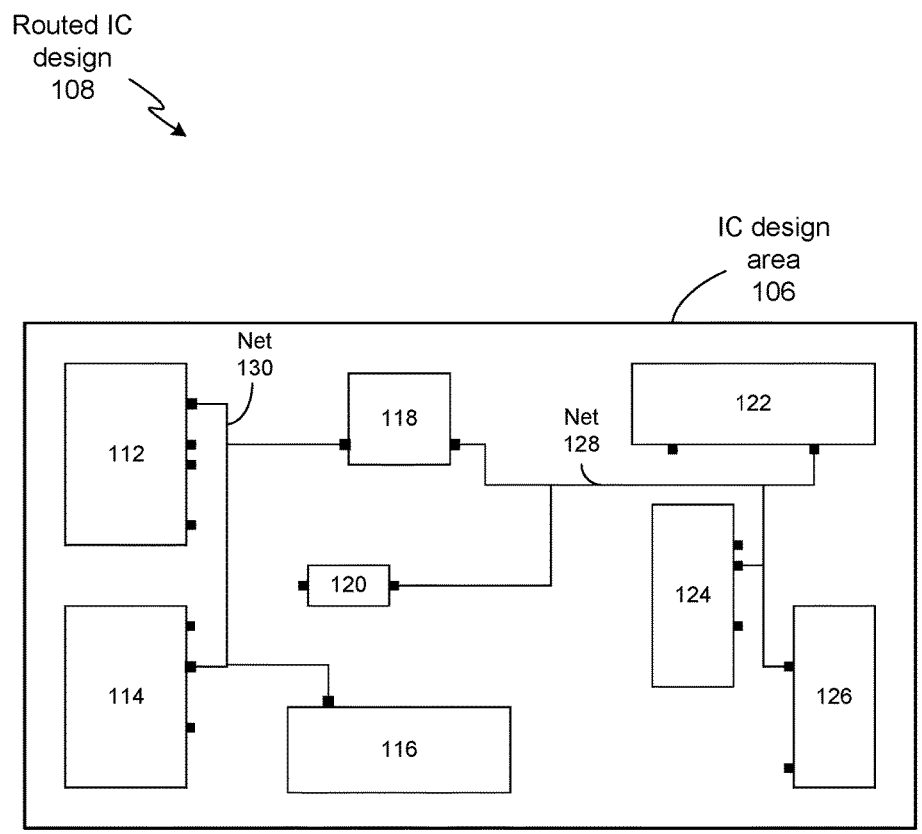
FIG. 1C illustrates an IC design after routing in accordance with some embodiments described herein.

FIG. 1A illustrates an IC design after synthesis in accordance with some embodiments described herein. A netlist can include a set of sequential and combinational gates that have been electrically connected to realize the desired functionality. Note that portion of netlist 102 illustrates a set of logic gates, but these have not been assigned a particular location, nor have they been implemented by using actual electronic components (e.g., transistors) that will be manufactured by a given semiconductor manufacturing technology. FIG. 1B illustrates an IC design after placement in accordance with some embodiments described herein. Placed IC design 104 includes a set of blocks (e.g., blocks 112, 114, 116, 118, 120, 122, 124, and 126) that may represent circuit objects at any level in the physical design hierarchy. For example, the blocks can be cells, macros, or any other circuit object at any level of the physical design hierarchy. Note that the blocks have an area, and are placed at a specific location in the IC design area 106. A block can have one or more pins, and each pin can be assigned to a net. In FIG. 1B, the small dark squares on the boundaries of the blocks represent pins (the assignment of the pins to nets is not illustrated in FIG. 1B). During routing, the pins that are assigned to a given net are electrically connected to each other by using metal wires. FIG. 1C illustrates an IC design after routing has been performed in accordance with some embodiments described herein. For example, net 130 electrically connects pins in blocks 112, 114, 116, and 118; and net 128 electrically connects pins in blocks 118, 120, 122, 124, and 126.

In this disclosure, the term "optimization" refers to modifications to an IC design that improve a performance metric of the IC design. For example, optimization can refer to one or more modifications that reduce delay, area, dynamic power consumption, and/or leakage power of an IC design. Different types of optimization-related modifications can be performed on an IC design to achieve the desired performance targets. Examples of optimization-related modifications include, but are not limited to, inserting or deleting a buffer in a net, inserting or deleting an inverter in a net, moving a gate in a net to a new location, resizing one or more gates in a net, and replacing a net with another net that performs an equivalent logical function.

Multiple optimization objectives can be minimized in an IC design. For example, an optimization process can begin by optimizing the IC design for timing in which one or more cells are replaced by optimal cell configurations to improve one or more timing metrics, e.g., by reducing the worst negative slack, the total negative slack, etc. Then, the IC design may be optimized for area (this step is also called "area recovery" in conventional design flows in which the total area of the IC design is reduced by reducing the size of the cells without worsening the timing metrics). Finally, the IC design can be optimized to reduce leakage power by replacing cells in the IC design with equivalent cells that have lower power leakage while ensuring that timing metrics are not worsened during this process.

Optimization-related modifications can be performed on the IC design during synthesis, design planning, and placement. Modifications that are performed on the IC design during routing are relatively minor (when compared to the optimization-related modifications that are performed during synthesis, design planning, and placement), and the routing-related modifications are usually performed to alleviate routing congestion (e.g., by spreading buffer chains) and/or to improve manufacturing yield (e.g., by inserting redundant vias). Therefore, in this disclosure, the term "optimization-related modifications," does not refer to modifications that are performed on the IC design during routing.

Routing an IC design is a complex and computationally intensive operation. A router typically starts by receiving multiple inputs, which can include, but are not limited to: (1) a placed netlist which provides the locations of the circuit cells/blocks (hereinafter "blocks"), (2) a description of the semiconductor manufacturing technology, which can include the number of metal layers, and the characteristics of the layers, (3) the assignment of pins/terminals to nets, (4) a set of design rules that need to be satisfied by the routing solution, and/or (5) timing slack at each pin in the netlist. The router then routes the wires and creates vias to electrically connect the pins/terminals assigned to each net.

A routing process typically has three stages: global routing, track assignment, and detailed routing. In the global routing stage, the router does not create detailed routing shapes for the wires. Instead, the router determines a high-level plan for routing the wires by partitioning the IC design into so-called "g-cells." In the track assignment stage, the router refines the global routing plan by assigning wires to tracks. Finally, in the detailed routing stage, the router starts with the coarse results produced by the global routing, and creates an exact path and the specific shapes for each wire. This stage is typically the most time-consuming and computationally intensive stage among the three routing stages. The design rules are typically checked during the detailed routing stage to ensure that the routed wires do not violate any of the design rules.

The size and complexity of IC designs continue to increase rapidly. Because optimization-related modifications are performed before routing is performed on the IC design, the optimization tool has to model the impact that routing will have on the timing of critical paths. Clearly, it is computationally infeasible to perform full-blown routing on the IC design every time an optimization-related modification is performed on the IC design (this should be obvious from the description of routing that was provided in the previous paragraph). Current IC design optimization tools either fail to converge on an IC design or produce low quality IC designs when the frequency, area, and power envelopes are pushed aggressively. The poor quality of optimization during synthesis and placement stages has become a major limiting factor on the performance and convergence of IC designs.

Some embodiments of the present invention are based on the following insight: current optimization approaches (that are used during synthesis and placement) do not accurately model the resistance and capacitance of the routed nets; this prevents existing optimization approaches from quickly converging on high-quality IC designs that have superior performance characteristics. The resistance and capacitance of the wires that will eventually be used to route a net can have a significant impact on the timing of the net, especially in advanced technology nodes. Specifically, in advanced technology nodes (e.g., 16 nm or lower), resistance variation across metal layers can be significant (e.g., it is possible to have a ~10,000× variation in the resistance across the metal layers), and the resistance contribution from vias can also be significant. Current optimization tools model some nets with overly pessimistic parasitics (i.e., resistance and capacitance values that are significantly lower than the actual resistance and capacitance values), and others with overly optimistic parasitics (i.e., resistance and capacitance values that are significantly higher than the actual resistance and capacitance values). Pessimism leads to over-designing, worse area, higher congestion (worse routability), worse power and longer convergence times. Optimism leads to poor convergence with increased chance of late-stage surprises. Both of these modeling inaccuracies, which exist in current optimization approaches, lead to sub-optimal IC designs.

Integrated Metal Layer Aware IC Design Optimization

Embodiments described herein are a breakthrough in the IC design industry for pre-route implementation/optimization. These embodiments offer a significant improvement in design performance and convergence for small/advanced technology nodes when they are compared with existing IC design tools.

Specifically, embodiments described herein solve the significant optimization problem that is created by the large resistance and capacitance variation across metal layers in advanced technology nodes, and the impact that this variation has on design convergence as the IC design representation progresses from a register transfer level (RTL) description to placed cells. In advanced (smaller) geometry nodes, via resistance is a much larger component of overall resistance. The models that conventional optimization tools use to estimate pre-route via resistance have a poor correlation with the actual via resistance that exists post-route. Embodiments described herein also solve the problem of accurately and efficiently estimating via resistance so that an accurate via resistance value can be used during optimization.

Embodiments described herein eliminate the archaic approach of using the same unit-RC (Resistance/Capacitance per unit length) for all nets. Instead, the pre-route optimization techniques described in this disclosure distribute nets across available metal layers in a way that a true global router would do.

Advanced geometry notes are imposing significant challenges to manufacturability and impact on interconnect parasitics. The latter problem in particular is causing traditional optimization techniques to lose steam. The optimization techniques that are described in this disclosure are layer aware, and allow a dramatic shift where layer parasitics become central to optimization. This enables new technology elements such as via pillars, auto-NDR ("NDR" refers to "non-default route") to be considered in the inner loop of optimization. This is in sharp contrast to the traditional methods where a separate step inserts via pillars or assigns NDRs, and these choices become rigid or constraints for the rest of the implementation flow. Instead, with the new approach disclosed herein, every optimization or netlist change choice evaluates the impact of via pillar insertion or/and NDR, and makes a choice based on improvement of the objective function.

Embodiments described in this disclosure have several important features. The first feature is a breakthrough new model called the layer calibration model (LCM). In one embodiment, the LCM takes as its input the horizontal and vertical net lengths, pin metal layers, timing slack, and some other parameters. The LCM then generates a list of preferred metal layers by considering gate and wire delays (note that wire delays include the impact of via resistance).

The second feature is the modeling of via resistance. The contribution of via resistance to wire delay is very high for the smaller geometry nodes. Embodiments described herein enable modeling of via resistance with significantly higher accuracy because the embodiments are layer-aware (the embodiments assign metal layers to the nets, and can accurately calculate the via resistance depending on which metal layer was assigned to the net). Such accurate via resistance was not possible in conventional approaches that are not layer-aware.

The third feature is metal layer utilization and correlation with a true global router. An important breakthrough is the consideration of metal layer utilization and routing potential/risk. This helps achieve good correlation between the routing model that is used by the optimization tool and the actual timing-driven global router that will be used later in the IC design flow when the IC design is routed.

The fourth feature is concurrent metal layer assignment and optimization. Conventional optimization tools cannot do this because of significant runtime and technology limitations. Embodiments described herein enable the unit-RC decision to be made concurrently with netlist transformation/optimization. Specifically, the metal layer assignment decision is part of the inner loop of optimization. This feature is important for several reasons, and is best illustrated with an example (this example is also described below with reference to FIGS. 5A-5C). Suppose an IC design includes a long two-pin net. This net is best routed in the upper layers, to take advantage of the lower resistance. However, such a net is likely to be buffered to reduce the transition time. Note that buffering a long net results in smaller nets, and assigning these smaller nets to the upper layers is no longer a good metal layer assignment. In contrast to conventional optimization tools, embodiments described herein allow the simultaneous reassignment of metal layers to nets during the inner loop of optimization, including during costing and what-if analysis.

The fifth feature is faster speed. Concurrent layer assignment and optimization requires layer assignment to be computationally efficient. The design of the LCM completely eliminates runtime as a problem or concern. The LCM takes as input a number of parameters that influence a net's preference for a layer. The input parameters include net length, pin count, pin metal layers, etc. The LCM uses these inputs to determine a preferred metal layer by taking into account multiple factors that include layer capacity and routability, gate and wire delays, and via resistance. The LCM is built dynamically in the IC design flow, on demand, and once built it is reused and refined throughout the flow as more data becomes available. The LCM ensures that the nets are distributed across the metal layers in a manner that correlates well with a global router. As mentioned before, an important feature of the LCM is that it is very fast (i.e., it requires a small amount of computation), which allows the LCM to be used in the inner loop of optimization.

The sixth feature is flexibility. The technology described herein works with any wire model—bounding box, virtual route, etc. In addition, it works with any wire delay model—lumped, Elmore, Arnoldi, etc. This allows this technology to be used anywhere in the implementation flow chain, e.g., at the front-end of the flow chain during synthesis, or at the back-end of the flow chain during pre-route optimization (i.e., during or after placement, but before routing).

The combination of computational efficiency, continuous refinement of the LCM, and continuous refinement of the net layer assignment as it works concurrently with optimization leads to a superior solution that has faster timing convergence, lower area, lower power, and lower buffer/inverter count. In summary, embodiments described herein provide the following advantages and improvements over existing approaches: (1) produce IC designs with smaller design area, cell count, power, and generally better timing QoR and runtime, (2) eliminate timing pessimism due to use of average unit-RCs, (3) net layer assignments are no longer constraints like those in existing optimization techniques (constraint-based approaches used in the existing techniques are severely sub-optimal), (4) tight integration with optimization allows netlist changes and net layer assignment to occur simultaneously (this feature results in superior convergence), and (5) accurate estimation of via resistance (via resistance is a significant component of net parasitics in small geometry nodes). Additionally, these benefits are available across all technology nodes, and the embodiments can support all wire models and delay models, and can easily be integrated into any optimization framework.

Figure 2:
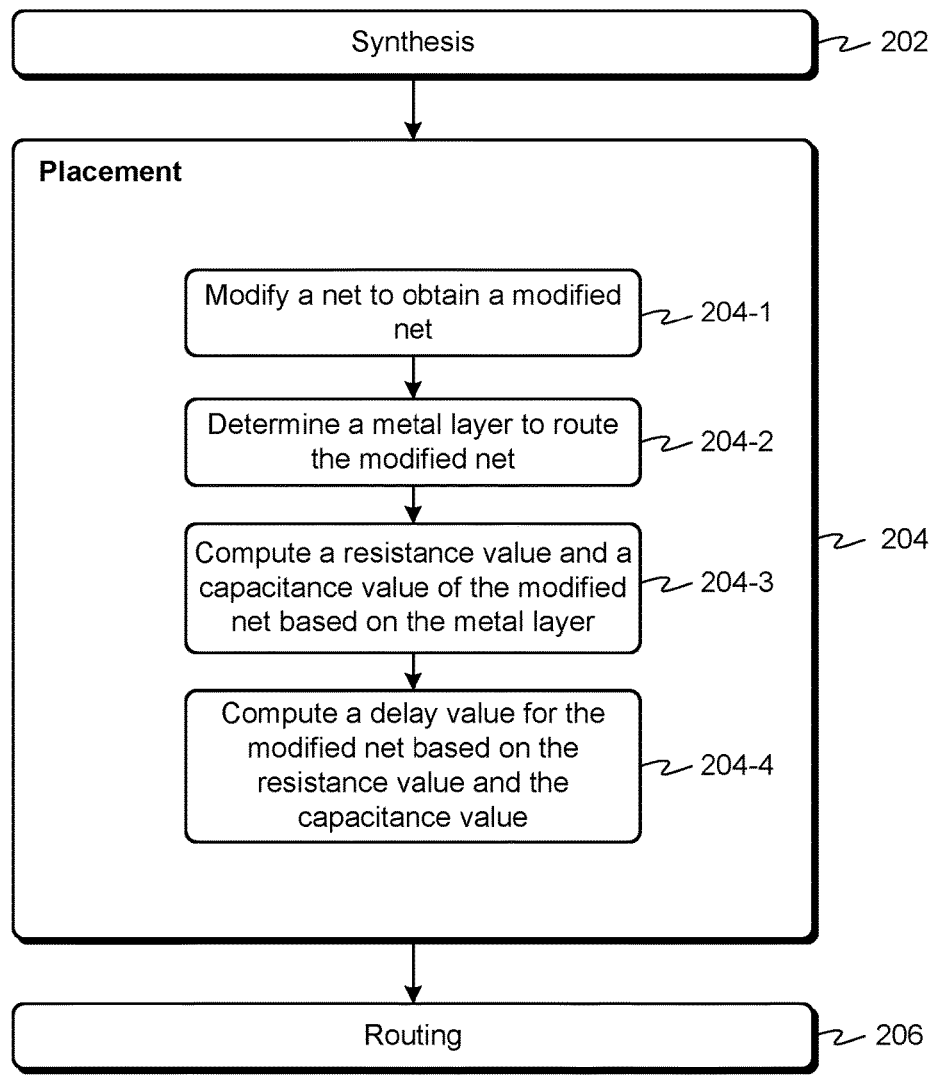
FIG. 2 presents a flowchart that illustrates a process for optimizing an IC design in accordance with some embodiments described herein.

FIG. 2 presents a flowchart that illustrates a process for optimizing an IC design in accordance with some embodiments described herein. The process can begin with synthesis (operation 202) in which a netlist (e.g., as shown in FIG. 1A) is created. Next, placement (operation 204) can be performed to obtain a placed IC design (e.g., as shown in FIG. 1B). Finally, routing (operation 206) can be performed to obtain a routed IC design (e.g., as shown in FIG. 1C).

During placement (operation 204), the process can iteratively perform a set of operations to minimize at least one of: a delay objective function for the IC design, an area objective function for the IC design, or a leakage power objective function for the IC design. Specifically, during placement (operation 204), the process can iteratively perform a set of operations that comprises: modifying a net in the IC design to obtain a modified net (operation 204-1), determining a metal layer for routing the modified net (operation 204-2), computing a resistance value and a capacitance value of the modified net based on the metal layer (operation 204-3), and computing a delay value for the modified net based on the resistance value and the capacitance value (operation 204-4). Operations 204-1 through 204-4 can also be performed during synthesis (operation 202).

Modifying a net in the IC design to obtain a modified net (operation 204-1) can comprise at least one of: inserting or deleting a buffer in the net, inserting or deleting an inverter in the net, moving one or more gates to a new location in the net, resizing one or more gates in the net, or replacing the net with another net that performs an equivalent logical function.

Determining the metal layer for routing the modified net (operation 204-2) can comprise: (1) for each metal layer in a set of metal layers, computing a routing cost for the modified net, and (2) selecting a metal layer having a lowest routing cost in the set of metal layers. The routing cost can be computed based on a set of parameters comprising (1) a horizontal length of the modified net, (2) a vertical length of the modified net, (3) metal layers associated with pins of the modified net, (4) a timing slack of the modified net, and (5) a metal layer utilization value associated with the metal layer. After determining the metal layer for routing the modified net, the process can update the metal layer utilization value associated with the metal layer so that the next iteration of the set of optimization operations can use the updated metal layer utilization value.

Computing the resistance value and the capacitance value of the modified net (operation 204-3) can comprise computing a unit resistance value and a unit capacitance value for the metal layer based on technology data that specifies physical and electrical characteristics of a set of metal layers that are created when an IC is manufactured based on the IC design. Computing the resistance value of the modified net can also comprise computing a via resistance value for the modified net based on the metal layer.

Computing the delay value for the modified net based on the resistance value and the capacitance value (operation 204-4) can comprise (1) calculating a new gate delay for a driver gate based on the capacitance value of the modified net, and (2) calculating a new wire delay using a wire model (bounding box, virtual route, etc.) and a wire delay model (e.g., lumped, Elmore, Arnoldi, etc.). The delay value of the modified net can be used to calculate the value of a timing metric (e.g., the total negative slack, the worst negative slack, etc.), and the timing metric can be used to decide whether or not to accept the optimization-related modification that was performed on the net. For example, if the optimization modification (1) does not improve a desired optimization goal (e.g., area, leakage power, etc.), and (2) worsens the timing metric value, then the IC design tool may decide to cancel the modification (e.g., by not committing the modification to the IC design or by undoing the modification), and try a different modification.

Figure 3:
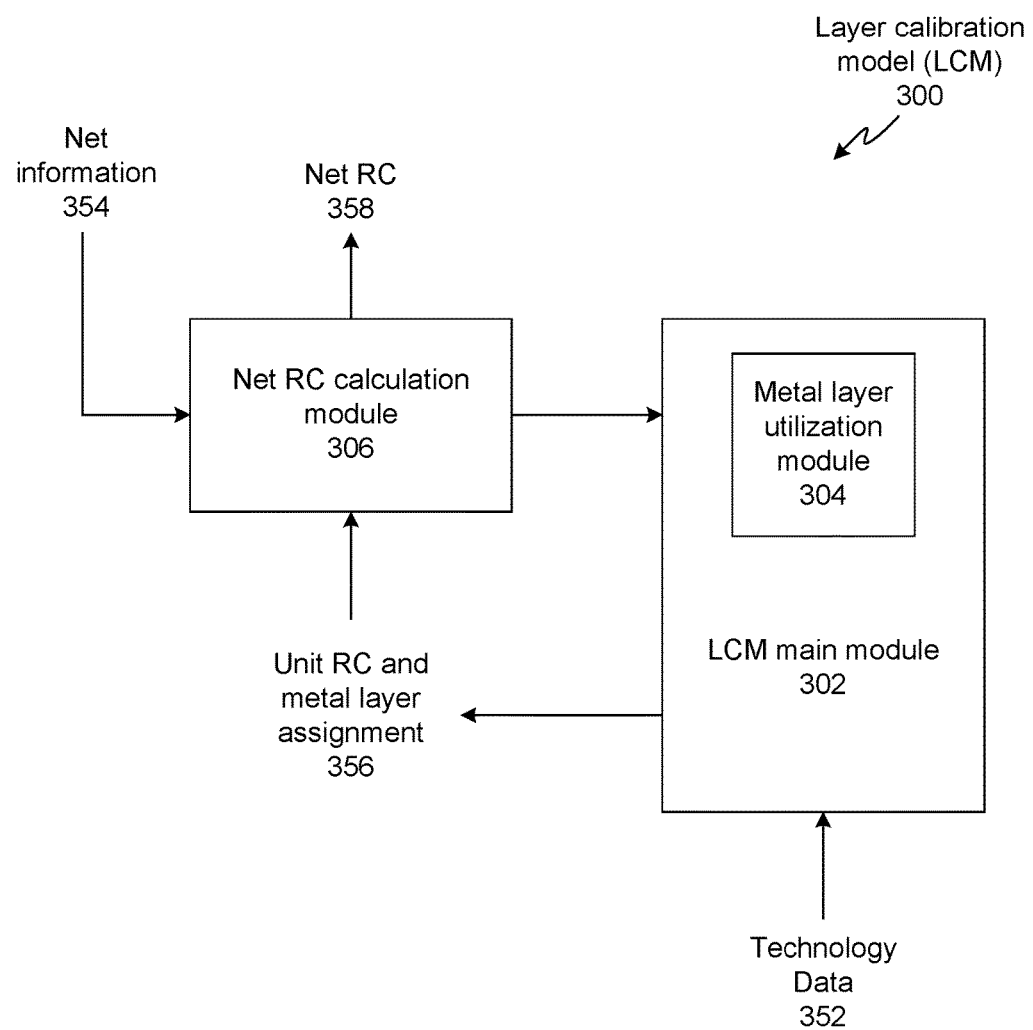
FIG. 3 illustrates a modular implementation of a layer calibration model (LCM) in accordance with some embodiments described herein.

FIG. 3 illustrates a modular implementation of LCM in accordance with some embodiments described herein. LCM 300 can include LCM main module 302, metal layer utilization module 304, and net RC calculation module 306. LCM main module 302 can receive technology data 352 that specifies physical and electrical characteristics of a set of metal layers that are created when an IC is manufactured based on the IC design. Based on technology data 352, LCM main module 302 can compute the unit resistance and capacitance values for each metal layer.

Metal layer utilization module 304 can keep track of the utilization of each metal layer. In one embodiment, each metal layer can be associated with a single utilization value. In another embodiment, each metal layer can be divided into multiple regions, and the metal layer utilization module 304 can keep track of a separate utilization value for each region of each metal layer. In yet another embodiment, the routing resources in each metal layer can be represented by a set of horizontal or vertical tracks, and the utilization of each track in each metal layer can be maintained by the metal layer utilization module 304. Net RC calculation module 306 can compute the RC value of a net by using a given wire model (bounding box, virtual route, etc.) and a wire delay model (e.g., lumped, Elmore, Arnoldi, etc.). In some embodiments, the wire model and the wire delay model can be user-selectable.

During operation, net information 354 can be provided to net RC calculation module 306. Net information 354 can comprise the pin locations of a net. For example, in FIG. 1C, the four pin locations of net 130 would be specified in net information 354. Note that a pin location also specifies the metal layer on which the pin exists. Next, net RC calculation module 306 can then convert the pin location information into an input that is used by the LCM main module 302 to determine the metal layer assignment for the net. In one embodiment, RC calculation module 306 can convert the pin location information into the following inputs: a horizontal length, a vertical length, and the metal layers on which each of the pins exist. The metal layer associated with each pin and the timing slack of the net (which were received as part of net information 354) can also be specified in net information 354, and this information can be passed along to LCM main module 302.

LCM main module 302 can use the input received from net RC calculation module 306 to determine a metal layer for the net. Once LCM main module 302 determines the metal layer to assign to the net, it can determine the unit RC. Next, LCM main module 302 can provide the unit RC and metal layer assignment 356 information to net RC calculation module 306. Net RC calculation module 306 can then use a wire model and a wire delay model (which can be user-selectable) to compute the net RC 358 (i.e., the resistance and capacitance for the net). Note that net RC calculation module 306 can also accurately compute the via resistance value because LCM main module 302 provides the metal layer assignment to the RC calculation module 306. Meanwhile, LCM main module 302 can also provide the metal layer assignment information to metal layer utilization module 304 which, in turn, can update the metal layer utilization values in its data structure.

In some embodiments, LCM main module 302 computes a routing cost for routing the net on each metal layer, and selects the metal layer with the lowest routing cost. The routing cost for each metal layer is computed by evaluating one or more linear and/or non-linear functions. Note that evaluating a set of linear and/or non-linear functions is significantly faster than executing a router that determines actual routes for individual nets. The routing cost can include multiple components. FIG. 4 illustrates a penalty cost computation in accordance with some embodiments described herein. Calculating the penalty cost is an important feature of embodiments described herein because the penalty cost enables the embodiments to quickly and accurately determine the impact of assigning a metal layer to a net by evaluating a non-linear function (as opposed to executing a router to determine the impact of the metal layer assignment).

As part of computing the routing cost, LCM main module 302 can compute the penalty cost for each layer as shown in FIG. 4. The term $u_i$ in FIG. 4 is the utilization percentage of the routing layer in terms of resources used for nets divided by the available metal resources. The index i refers to a separate term for each layer. The term $u_{ti}$ is the utilization percentage target that is the preferred upper bound for the $u_i$ term. The $p_i$ term is the penalty cost for the costs that determine which layer is used for each net. The $c_{ni}$ term is the cost for each net to route to each routing layer which is determined by the layer assignment algorithm multiplied by penalty cost $p_i$. The lowest cost horizontal and vertical routing layer with available utilization would be used for the choice for routing. The $C1_i$ term is the sum of all the $c_{ni}$ terms for those which are the minimum cost for the net and the routing layer i. The $C2_i$ term is the sum of all the $c_{ni}$ terms for those which are the next best minimum cost for the net after the best routing layer i.

The penalty calculation illustrated in FIG. 4 begins by initializing seed routing penalties for each layer, i.e., the $p_i$ terms, based on the ratio of the widths of the layers. Narrow base routing layers start with $p_i=1.0$ and wider routing layers have $p_i>1.0$ based on ratio of wider routing layer width to the narrow base routing layer width and constant factor. The target utilization term $u_{ti}$ is a given constant correlated to actual router performance. All other terms $u_i$, $c_{ni}$, $C1_i$, and $C2_i$ are computed using the layer assignment calculation process. The routing penalty cost term $p_i$ for each routing layer will be adjusted as long at the utilization for any layer, $u_i$, exceeds its target, $u_{ti}$. The adjustment uses the existing penalty, $p_i$, as well as the other terms $u_i$, $u_{ti}$, $C1_i$, $C2_i$, and constant k to adjust the penalty towards pushing nets to the $2^{nd}$ lowest cost routing layer. The layer assignment calculation process is repeated to get new $u_i$, $u_{ti}$, $C1_i$, and $C2_i$ terms. The process of adjusting the penalty terms to meet the utilization target can be repeated iteratively.

Figure 5C:
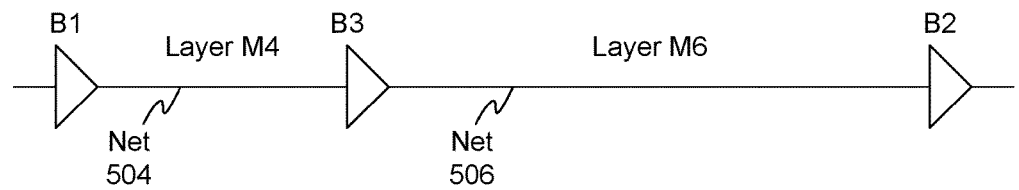

FIGS. 5A-5C illustrate an advantage of integrated metal layer aware IC design optimization in accordance with some embodiments described herein. Suppose net 502 shown in FIG. 5A electrically connects two buffers B1 and B2 that are located far away from each other in the IC design. Metal layers can be labeled M1, M2, M3, . . . , Mn, wherein metal layer M1 is the lowest metal layer (i.e., M1 is the metal layer closest to the substrate), and metal layer Mn is the highest metal layer (i.e., Mn is the metal layer furthest from the substrate). In general, higher metal layers have lower unit resistances. An IC design optimization approach may initially assign a metal layer to net 502 that is high up in the metal layer stack, e.g., let's assume that net 502 is assigned metal layer M9.

In existing IC design optimization approaches, the initial metal layer assignment is not changed during optimization. For example, as shown in FIG. 5B, suppose buffer B3 is inserted during optimization, thereby splitting net 502 into two smaller nets 504 and 506. Then, in existing optimization approaches, nets 504 and 506 will still be assigned to metal layer M9, which most likely is no longer the optimal metal layer assignment.

In contrast to existing approaches, embodiments described herein can change the metal layer assignment in the inner optimization loop. For example, as shown in FIG. 5C, embodiments described herein may use LCM 300 to determine that metal layer M4 should be assigned to net 504, and metal layer M6 should be assigned to net 506. Specifically, in the inner optimization loop, the delay from the input of buffer B1 to the output of buffer B3, and the delay from the input of buffer B3 to the output of buffer B2 can be used to determine the optimal metal layers to assign to these nets. Note that the gate delay from the input of a driver gate (e.g., input of buffer B1) to the output of the driver gate (e.g., output of buffer B1) depends upon the capacitive load that is applied to the output of the buffer. Usually a non-linear delay model is used to determine the delay. The capacitive load on the buffers changes when the inner optimization loop splits a long net into multiple smaller nets by inserting one or more buffers. Embodiments described herein assign metal layers to the smaller nets by taking into account the impact the new capacitive loads will have on the gate delays based on a non-linear delay model. In this manner, embodiments described herein are able to optimally assign metal layers to nets as the IC design is being optimized, thereby producing IC designs with smaller design areas, cell counts, power, and generally better timing QoRs and runtimes.

Experiments were conducted on large and complex IC designs, and the optimized IC designs that were produced by existing approaches were compared with the optimized IC designs that were produced by embodiments of the present invention. When compared to existing approaches, the embodiments of the present invention produced optimized IC designs that had (1) 1.5% lower IC design area, (2) 1.4% lower worst-negative slack, (3) 23% lower total negative slack, (4) 3% lower buffer and inverter count, and (5) 6% lower leakage power. All of these improvements were achieved without increasing the total amount of wall time required to produce the optimized IC design.

IC Design System

Figure 6:
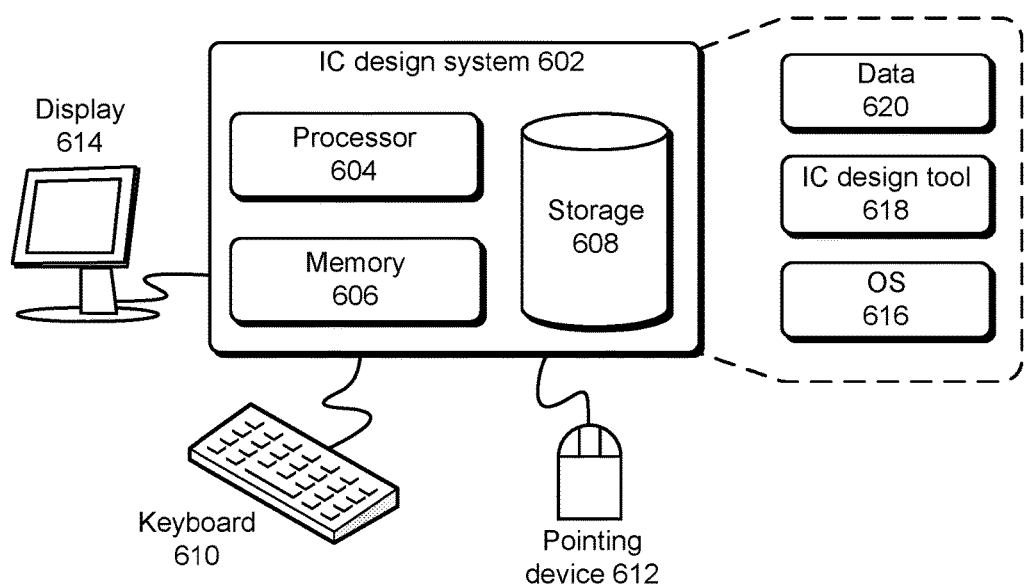
FIG. 6 illustrates an IC design system in accordance with some embodiments described herein.

The term "IC design system" generally refers to a hardware-based system that is capable of executing an IC design tool. FIG. 6 illustrates an IC design system in accordance with some embodiments described herein. IC design system 602 can include processor 604, memory 606, and storage device 608. Specifically, memory locations in memory 606 can be addressable by processor 604, thereby enabling processor 604 to access (e.g., via load/store instructions) and manipulate (e.g., via logical/floating point/arithmetic instructions) the data stored in memory 606. IC design system 602 can be coupled to display device 614, keyboard 610, and pointing device 612. Storage device 608 can store operating system 616, IC design tool 618, and data 620. Data 620 can include input required by IC design tool 618 and/or output generated by IC design tool 618.

IC design system 602 may automatically (or with user help) perform one or more operations that are implicitly or explicitly described in this disclosure. Specifically, IC design system 602 can load IC design tool 618 into memory 606, and IC design tool 618 can then be used to optimize an IC design.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions for an integrated circuit (IC) design tool that, when executed by a computer, cause the computer to perform a method for optimizing an IC design, the method comprising:
   before routing is performed on the IC design in an IC design flow, the computer iteratively performing a set of operations, the set of operations comprising:
      modifying a net in the IC design to obtain a modified net, determining a metal layer for routing the modified net, computing a resistance value and a capacitance value of the modified net based on the metal layer, and computing a delay value for the modified net based on the resistance value and the capacitance value.

2. The non-transitory computer-readable storage medium of claim 1, wherein said modifying the net comprises at least one of: inserting or deleting a buffer in the net, inserting or deleting an inverter in the net, moving one or more gates to a new location in the net, resizing one or more gates in the net, or replacing the net with another net that performs an equivalent logical function.

3. The non-transitory computer-readable storage medium of claim 2, wherein the set of operations minimizes at least one of: a delay objective function for the IC design, an area objective function for the IC design, or a leakage power objective function for the IC design.

4. The non-transitory computer-readable storage medium of claim 1, wherein said computing the resistance value and the capacitance value of the modified net comprises computing a unit resistance value and a unit capacitance value for the metal layer based on technology data that specifies physical and electrical characteristics of a set of metal layers that are created when an IC is manufactured based on the IC design.

5. The non-transitory computer-readable storage medium of claim 1, wherein said determining the metal layer to route the modified net comprises:
for each metal layer in a set of metal layers, computing a routing cost for the modified net, and
selecting a lowest routing cost metal layer in the set of metal layers.

6. The non-transitory computer-readable storage medium of claim 5, wherein the routing cost is computed based on a set of parameters comprising (1) a horizontal length of the modified net, (2) a vertical length of the modified net, (3) metal layers associated with pins of the modified net, (4) a timing slack of the modified net, and (5) a metal layer utilization value associated with the metal layer.

7. The non-transitory computer-readable storage medium of claim 6, wherein after determining the metal layer, the method comprises updating the metal layer utilization value associated with the metal layer to obtain an updated metal layer utilization value, and wherein a next iteration of the set of operations uses the updated metal layer utilization value.

8. The non-transitory computer-readable storage medium of claim 6, wherein said computing the resistance value of the modified net comprises computing a via resistance value for the modified net based on the metal layer.

9. An apparatus comprising:
a processor; and
a non-transitory computer-readable storage medium storing instructions for an integrated circuit (IC) design tool that, when executed by the processor, cause the apparatus to perform a method for optimizing an IC design, the method comprising:
before routing is performed on the IC design in an IC design flow, iteratively performing a set of operations, the set of operations comprising:
modifying a net in the IC design to obtain a modified net,
determining a metal layer for routing the modified net,
computing a resistance value and a capacitance value of the modified net based on the metal layer, and
computing a delay value for the modified net based on the resistance value and the capacitance value.

10. The apparatus of claim 9, wherein said modifying the net comprises at least one of: inserting or deleting a buffer in the net, inserting or deleting an inverter in the net, moving one or more gates to a new location in the net, resizing one or more gates in the net, or replacing the net with another net that performs an equivalent logical function.

11. The apparatus of claim 10, wherein the set of operations minimizes at least one of: a delay objective function for the IC design, an area objective function for the IC design, or a leakage power objective function for the IC design.

12. The apparatus of claim 9, wherein said computing the resistance value and the capacitance value of the modified net comprises computing a unit resistance value and a unit capacitance value for the metal layer based on technology data that specifies physical and electrical characteristics of a set of metal layers that are created when an IC is manufactured based on the IC design.

13. The apparatus of claim 9, wherein said determining the metal layer to route the modified net comprises:
for each metal layer in a set of metal layers, computing a routing cost for the modified net, and
selecting a lowest routing cost metal layer in the set of metal layers.

14. The apparatus of claim 13, wherein the routing cost is computed based on a set of parameters comprising (1) a horizontal length of the modified net, (2) a vertical length of the modified net, (3) metal layers associated with pins of the modified net, (4) a timing slack of the modified net, and (5) a metal layer utilization value associated with the metal layer.

15. The apparatus of claim 14, wherein after determining the metal layer, the method comprises updating the metal layer utilization value associated with the metal layer to obtain an updated metal layer utilization value, and wherein a next iteration of the set of operations uses the updated metal layer utilization value.

16. The apparatus of claim 14, wherein said computing the resistance value of the modified net comprises computing a via resistance value for the modified net based on the metal layer.

17. A method for optimizing an IC design, the method comprising:
before routing is performed on the IC design in an IC design flow, an IC design tool in a computer iteratively performing a set of operations, the set of operations comprising:
modifying a net in the IC design to obtain a modified net,
determining a metal layer for routing the modified net,
computing a resistance value and a capacitance value of the modified net based on the metal layer, and
computing a delay value for the modified net based on the resistance value and the capacitance value, wherein said computing the resistance value of the modified net comprises computing a via resistance value for the modified net based on the metal layer.

18. The method of claim 17, wherein the set of operations minimizes at least one of: a delay objective function for the IC design, an area objective function for the IC design, or a leakage power objective function for the IC design, and wherein said modifying the net comprises at least one of: inserting or deleting a buffer in the net, inserting or deleting an inverter in the net, moving one or more gates to a new location in the net, resizing one or more gates in the net, or replacing the net with another net that performs an equivalent logical function.

19. The method of claim 17, wherein said computing the resistance value and the capacitance value of the modified net comprises computing a unit resistance value and a unit capacitance value for the metal layer based on technology data that specifies physical and electrical characteristics of a set of metal layers that are created when an IC is manufactured based on the IC design.

20. The method of claim 17, wherein said determining the metal layer to route the modified net comprises:
- for each metal layer in a set of metal layers, computing a routing cost for the modified net, wherein the routing cost is computed based on a set of parameters comprising (1) a horizontal length of the modified net, (2) a vertical length of the modified net, (3) metal layers associated with pins of the modified net, (4) a timing slack of the modified net, and (5) a metal layer utilization value associated with the metal layer;
- selecting a lowest routing cost metal layer in the set of metal layers; and
- updating the metal layer utilization value associated with the metal layer to obtain an updated metal layer utilization value, wherein a next iteration of the set of operations uses the updated metal layer utilization value.

* * * * *